US006287405B1

(12) United States Patent
Stevenson et al.

(10) Patent No.: US 6,287,405 B1
(45) Date of Patent: Sep. 11, 2001

(54) METHOD AND COMPOSITION FOR COSMETICALLY REPAIRING A BLEMISH IN A POLYOLEFIN OBJECT

(76) Inventors: Michael J. Stevenson, 1200 Soldier Pass Rd., Sedona, AZ (US) 86336; Robert A. Reeves, 845 Oasis Dr., Cottonwood, AZ (US) 86326; Matthew Stevenson, 385 Ross Rd., Sedona, AZ (US) 86336

( * ) Notice: Subject to any disclaimer, the term of this patent is extended or adjusted under 35 U.S.C. 154(b) by 0 days.

(21) Appl. No.: 09/256,646

(22) Filed: Feb. 23, 1999

(51) Int. Cl.$^7$ ........................................................ B32B 35/00
(52) U.S. Cl. .............................. 156/94; 156/82; 264/36.1; 264/36.15; 264/36.22; 264/80; 427/140; 427/195; 427/375; 524/272; 524/274; 524/275; 524/462; 524/464; 524/475; 524/476; 524/487; 524/490; 524/583; 524/585
(58) Field of Search ..................................... 524/271, 272, 524/274, 275, 464, 476, 462, 487, 490, 583, 585, 475; 264/36.1, 36.15, 36.22, 80; 156/94, 82; 427/140, 195, 375

(56) References Cited

U.S. PATENT DOCUMENTS

| 3,189,573 | * | 6/1965 | Oken ................................. 524/487 X |
| 4,154,789 | | 5/1979 | Delacoste . |
| 4,156,672 | * | 5/1979 | Fitko et al. ........................... 524/484 |
| 4,239,796 | | 12/1980 | Shanoski et al. . |
| 4,252,762 | | 2/1981 | Stevenson . |
| 4,260,439 | * | 4/1981 | Speer ............................. 264/36.22 X |
| 4,282,285 | | 8/1981 | Mohiuddin . |
| 4,356,230 | | 10/1982 | Emanuel et al. . |
| 4,389,454 | | 6/1983 | Horacek et al. . |
| 4,499,235 | | 2/1985 | Verwer et al. . |
| 4,519,972 | | 5/1985 | Stevenson . |
| 4,544,578 | * | 10/1985 | Duane, Jr. ....................... 264/36.1 X |
| 4,548,779 | | 10/1985 | Steinberg et al. . |
| 4,681,712 | | 7/1987 | Sakakibara et al. . |
| 4,980,107 | | 12/1990 | Falline et al. . |
| 4,980,113 | | 12/1990 | Cummings et al. . |
| 5,035,849 | | 7/1991 | Uemura et al. . |
| 5,164,127 | | 11/1992 | Boeckeler . |
| 5,304,332 | | 4/1994 | Richart . |
| 5,746,961 | | 5/1998 | Stevenson et al. . |
| 5,840,142 | | 11/1998 | Stevenson et al. . |

FOREIGN PATENT DOCUMENTS

| 0 562 716 A1 | 2/1993 | (EP) . |
| 917844 | 11/1961 | (GB) . |
| 48-42211 | 11/1973 | (JP) . |
| 49-017363 | 2/1974 | (JP) . |

* cited by examiner

*Primary Examiner*—Fred Teskin
(74) *Attorney, Agent, or Firm*—Myers, Dawes & Andras; Joseph C. Andras

(57) ABSTRACT

There is disclosed a method and composition for cosmetically repairing a surface void in polyolefin objects. The method involves inserting a repair composition into the void and then applying heat thereto to fuse the repair composition with a surrounding portion of the polyolefin object. The repair composition is a physical mixture of a thermoplastic powder, a resin binder, and a solvent, having a paste-like consistency. The repair composition may be neutral in color, or may contain a colorant to closely match the underlying object. The heating step can be performed with an open flame or with a heat gun.

24 Claims, 3 Drawing Sheets

METHOD AND COMPOSITION FOR COSMETICALLY REPAIRING A BLEMISH IN A POLYOLEFIN OBJECT

BACKGROUND OF THE INVENTION

1. Field of the Invention

The invention relates generally to repairing molded polyolefin objects and, more particularly, to a method and composition for cosmetically repairing a surface blemish in such an object.

2. Description of the Related Art

Polyolefin plastics are a broad category of materials including, but not limited to, polyethylene, polypropylene, and ethyl-vinyl acetate. Numerous everyday objects are made from polyolefin plastics (sometimes hereafter "objects" or "polyolefin objects.") Such objects are commonly formed from various molding operations such as injection molding, blow molding, rotational molding, and so on.

The manufactures of polyolefin objects generally strive to achieve highly efficient, cost-effective manufacturing processes to effectively compete in their given markets. The foregoing molding processes invariably damage a certain percentage of the objects, however, due to bad parting lines, trapped air pockets, tight mold radii, difficult to mold resins, and the like. The damage is often only cosmetic and not structural. The "damaged" object, therefore, could easily perform its intended task. Because it is not marketable in its damaged condition, however, the damaged object is usually discarded or ground up and re-molded into subsequent objects, thereby increasing the overall manufacturing cost and lowering the quality of the subsequent objects.

There remains a need, therefore, for a method and composition for salvaging polyolefin objects which are nominally defective due only to cosmetic blemishes.

OBJECTIVES OF THE INVENTION

It is an objective of this invention to provide a method for cosmetically repairing a blemish in a polyolefin object.

It is a further objective of the invention to provide a method for permanently repairing a blemish in a polyolefin object.

It is a further objective of the invention to provide a method for cosmetically repairing a blemish in a polyolefin object wherein the repair matches the color of the original object.

other and related objectives will be apparent from the following description of the invention.

SUMMARY OF INVENTION

In a first aspect, the invention may be regarded as a method of repairing a surface blemish consisting of a void in a surface of a polyolefin object comprising the steps of: (a) inserting a repair composition into said void wherein said repair composition consists essentially of: (i) 30 to 60 weight percent of a thermoplastic component consisting of particulate polyolefin powder selected from the group consisting of polyethylene, polypropylene, and ethylene-vinyl acetate (EVA); (ii) 15 to 45 weight percent of a resin component selected from the group consisting of aliphatic and aromatic hydrocarbon, polyterpene, rosin and rosin-ester, chlorinated polyolefin resins, petroleum, and synthetic and oxidized waxes; and (iii) 5 to 35 weight percent of a solvent component; and (b) heating the repair composition in said void and a surrounding portion of said polyolefin object by exposing the repair composition and the surrounding portion of said polyolefin object to atmospheric heating at a temperature sufficient to fuse said repair composition to said polyolefin object.

In a second aspect, the invention may be regarded as a repair composition for repairing a surface blemish consisting of a void in a surface of a polyolefin object, said repair composition consisting essentially of: (a) 30 to 60 weight percent of a thermoplastic component consisting of particulate polyolefin powder selected from the group consisting of polyethylene, polypropylene, and ethylene-vinyl acetate (EVA); (b) 15 to 45 weight percent of a resin component selected from the group consisting of aliphatic and aromatic hydrocarbon, polyterpene, rosin and rosin-ester, chlorinated polyolefin resins, petroleum, and synthetic and oxidized waxes; and (c) 5 to 35 weight percent of a solvent component

BRIEF DESCRIPTION OF THE DRAWINGS

The just summarized invention may best be understood with reference to the Figures of which.

BRIEF DESCRIPTION OF THE PREFERRED EMBODIMENTS

Figure 1:
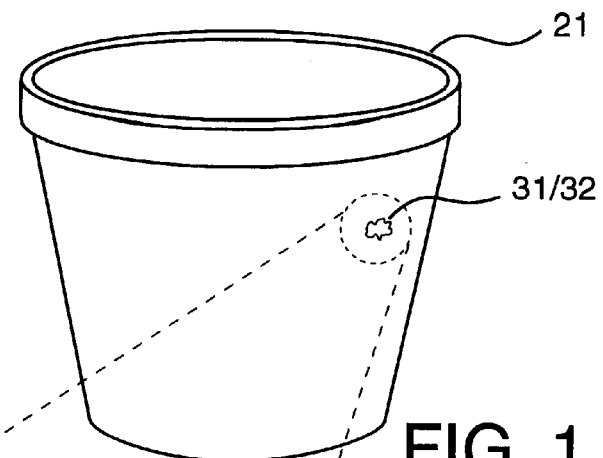
FIG. 1 is a perspective view of a polyolefin object having a cosmetic surface blemish.

FIG. 1 shows a typical polyolefin object 21 consisting of a pot made by rotationally molding polyethylene. Such an object 21 may be manufactured to have a texture and color such that the resulting object 21 appears substantially like a terracotta pot made of heavy, more expensive clay. The particular object 21 shown is an exemplary object offered only to illustrate the novel features of the present invention. The method and composition of this invention, moreover, may be applied to virtually any object formed from a polyolefin plastic object and the indication of polyethylene should also be considered exemplary in nature.

FIG. 1 furthers show that the polyolefin object 21 was manufactured with a cosmetic imperfection or "blemish" 31 consisting of a small void, pit, blow hole, or air pocket 32 (hereafter simply "void"). As noted above, such a blemish 31 may render the polyolefin object 21 unmarketable and it may be necessary to regrind the object 21 or even discard it altogether. The method and composition of this invention, however, makes it possible to perform cosmetic repairs on polyolefin objects and thereby salvage objects which may otherwise be treated as scrap.

Figure 2:
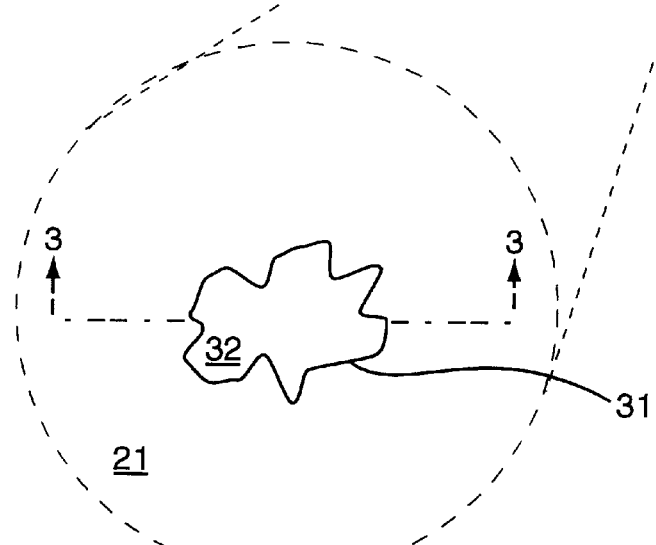
FIG. 2 is a close-up view of the surface blemish of FIG. 1.
Figure 3:
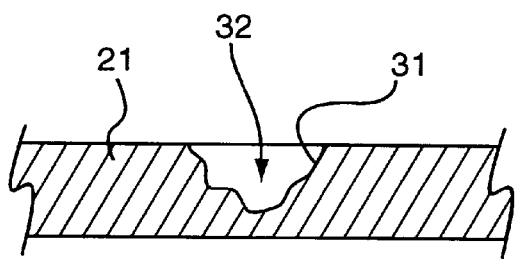
FIG. 3 is a cross-sectional view of FIG. 2, taken along section lines 3—3, showing the wall of the polyolefin object and the void defining the surface blemish.

FIGS. 2 and 3 show the hypothetical blemish 31 in more detail. FIG. 2, in particular, is a close-up view of the encircled portion of FIG. 1, showing the object 21 and its blemish 31. FIG. 3, on the other hand, is a cross-sectional view of FIG. 2 taken along section lines 3—3, showing the object's wall 21 and the blemish 31 from the side, with the latter's void 32 clearly visible. The challenge here was to develop an innovative method and composition suitable for filling the void 32 and thereby eliminating the blemish 31.

The invention, therefore, comprises filling the void 32 with a suitable repair composition and then atmospherically heating the repair composition such that the repair composition flows fully into the void and fuses with the underlying object 21.

The repair composition generally comprises a physical mixture of a thermoplastic powder, a binder resin, and a solvent. The components and relative proportions should be chosen such that the solvent forms less than about 50 weight percent of the overall composition such that the resulting repair composition has a paste-like consistency and can, therefore, remain in the void 32 prior to and during the application of heat and, perhaps, during an intermediate evaporation period.

The first component of the preferred repair composition is a thermoplastic component consisting of particulate polyolefin powder selected from the group consisting of polyethylene (e.g. ultra-high molecular weight polyethylene), polypropylene, and ethylene-vinyl acetate (EVA). The possible polyethylene include ultra-high molecular weight polyethylene (UHD), high-density polyethylene (HD), low-density polyethylene (LD), and linear low density polyethylene. UHD is not often used to make the underlying polyolefin object because it does not flow very well and is hard to process. UHS may be suitable for this application, however, because it has exceptional abrasion characteristics that provide a tough repair patch. The particulate polyolefin powder should have a particle size of about 50 mesh down to 5 microns in size and a relatively low melt index of 100 or below. The particulate polyolefin powder should make up 30 to 60 weight percent of the overall repair composition.

The second component of the preferred repair composition is a binder resin selected from the group consisting of aliphatic and aromatic hydrocarbon, polyterpene, rosin and rosin-ester, chlorinated polyolefin resins, petroleum, and synthetic and oxidized waxes. The preferred binder resin component is a cycolaliphatic hydrocarbon resin having a water white color which, at least to some degree, transmits the color of the underlying polyolefin object after completing the repair. The binder resin should make up 15 to 45 weight percent of the overall repair composition.

The third component of the preferred repair composition is a solvent including any solvent that will dissolve the selected binder resins. The possible solvents include water, Toluene, Hexane, and 1-chloro-4 (trifluoromethylbenzene). Water may be used, but is tends to evaporate very slowly. 1-chloro-4 (trifluoromethylbenzene) is desirable for many applications because it evaporates relative quickly, but is not flammable.

Finally, in lieu of relying on the translucent nature of the neutral "water white" color of the particular binder resin as discussed above, the repair composition may optionally include an appropriate colorant that proactively causes the resulting repair patch to closely match the color of the polyolefin object 21. The use of a colorant may beneficially ensure a seamless match between the patch and the product. The colorant may be any suitable pigment or dye. Inorganic pigments that are useful include titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri-ferrocyanide, ultramarine blues, (a calcined mixture of china clay, sodium carbonate, silica, sulfur and reducing agents), cobalts aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica etc. Various organic pigments which are useful include azo pigments, such as benzimidazolone pigments, pyrazalone pigments, copper phthalocyanine, quinacridones, anthraquinones, condensation pigments, tetra-chloro-isoindolinones, carbon blacks, etc.

In summary, the repair composition consists essentially of: (a) 30 to 60 weight percent of a thermoplastic component consisting of particulate polyolefin powder selected from the group consisting of polyethylene (e.g. ultra-high molecular weight polyethylene), polypropylene, and ethylene-vinyl acetate (EVA); (b) 15 to 45 weight percent of a resin component selected from the group consisting of aliphatic and aromatic hydrocarbon, polyterpene, rosin and rosin-ester, chlorinated polyolefin resins, petroleum, and synthetic and oxidized waxes; and (c) 5 to 35 weight percent of a solvent component (e.g. water). A colorant is optional.

The preferred repair composition is specifically designed to repair polyolefin objects formed from polyethylene. The preferred repair composition, one that is particularly suitable for such purpose, consists essentially of about 44 weight percent of a polyethelene powder having a melt index of 100 or below; about 36 weight percent of a cycloalipathic hydrocarbon resin that is compatible with the polyethelene powder when heat is applied (e.g. a softening point and ultimate viscosity at the anticipated temperature) and has a desirable color (e.g. water white as opposed to brown or yellow so that it that may be suitable without colorant or is compatible with the use of a colorant); and about 20 weight percent of a non-flammable solvent called 1 chloro-4 (trifluoromethylbenzene) such that the composition is not flammable, paste-like, and easily evaporated.

The ingredients should be intimately admixed and blended, a process which may be accomplished in any machine that can handle paste-like products. Examples of such mixers include planetary mixers, horizontal kneaders, extruders, and any other mixer that can handle high viscosity materials.

FIGS. 4 to 7 illustrate the steps of a first preferred method of repairing a polyolefin object using a repair composition according to this invention.

Figure 4:
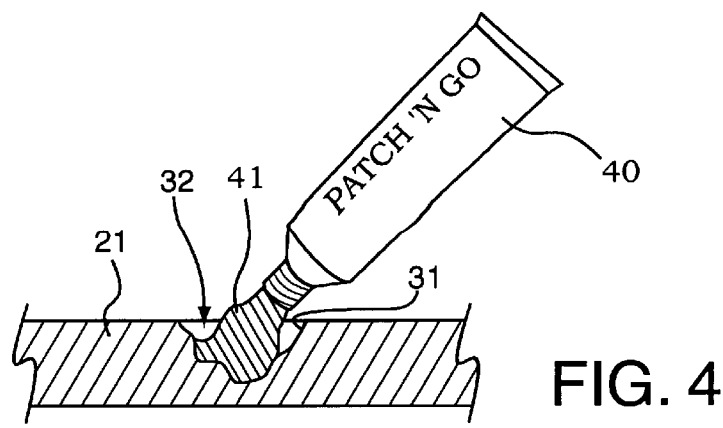
FIGS. 4 to 7 show a method of repairing a surface blemish in a polyolefin object according to this invention, the method comprising the steps of filling a first portion of said blemish with a repair composition made according to this invention and then heating the repair composition to a temperature sufficient to fuse said repair composition with said polyolefin object.
Figure 5:
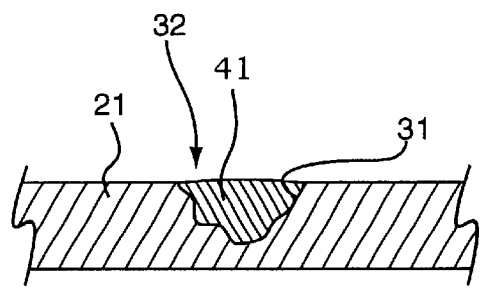

The first step generally comprises the step of filling a first portion of the void 32 with the repair composition 41. The repair composition 41 may be transported in any suitable container (e.g. bottle, can, squeeze tube, and so on) and then automatically or manually delivered to the void 32 in any suitable manner (e.g. the end of a screw driver, a tooth pick, a putty knife). FIG. 4 shows a preferred delivery manner where a small amount of repair composition 41 is squeezed out of a tube 40 and directly into the void 32. FIG. 5 shows the void 32 filled with the repair composition 41 and, as may sometimes be desired, slightly over-filled to allow for subsequent shrinkage.

Figure 6:
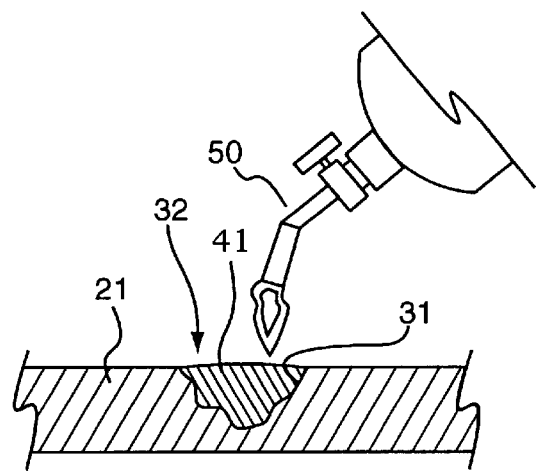
Figure 7:
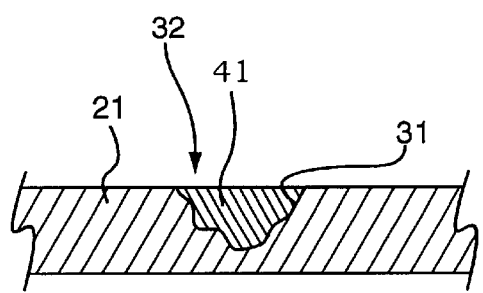

The second step generally comprises heating the repair composition 41 filling the void 32 by exposing the repair composition 41 to atmospheric pressure heating at a temperature sufficient to fuse the repair composition 41 with the underlying object 21 containing the blemish 31. The preferred way of implementing the heating steps us an open flame or hot air from a heat gun so as to increase the temperature of the repair composition 41 and the surrounding portion of the object 21 to at least 270 degrees Fahrenheit. FIG. 6, in particular, shows a propane torch 50 being used to apply heat through the direct application of an open flame. Other methods of applying heat may be used, but care should be taken to heat only the area of the repair and to make sure that warpage or discoloration does not occur due to overheating the patch or surrounding plastic area. FIG. 7 shows the final repair wherein the repair composition 41 is suitable flush with the surface of the underlying object 21.

The solvent in the repair composition is preferably allowed to evaporate before applying heat to the composition because the application of high temperature heat may form bubbles within the patch. The evaporation may occur at ambient temperatures or by way of "forced evaporation" through the application of heat at an elevated temperature that is sufficiently high to speed up evaporation, but is below the melting point of the particulate polyolefin powder. Forced evaporation may be conveniently implemented through the use of a heat gun held at a distance from the patch.

Figure 8:
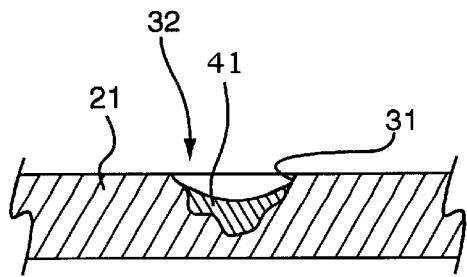
FIGS. 8 to 12 show additional steps that may be needed in repairing a surface blemish in a polyolefin object according to this invention, the additional steps being implemented if the initial repair steps of FIGS. 4 to 6 result in a recessed repair as shown in FIG. 8, rather than a flush repair as shown in FIG. 7.
Figure 9:
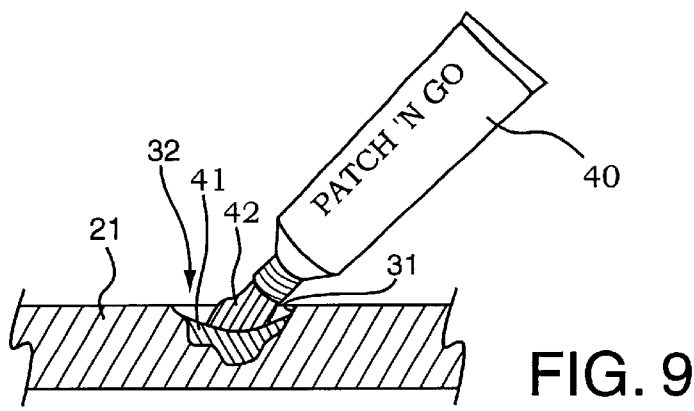
Figure 10:
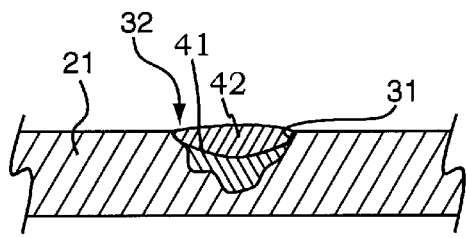
Figure 11:
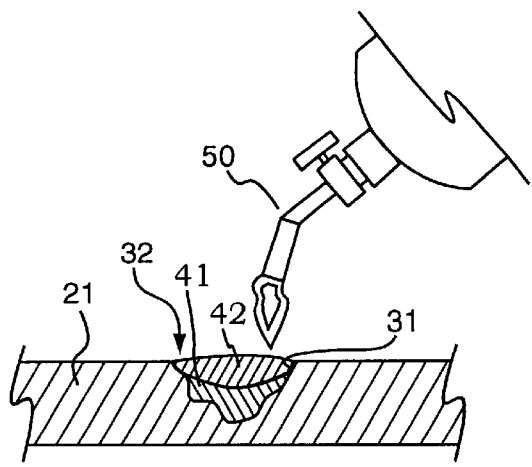
Figure 12:
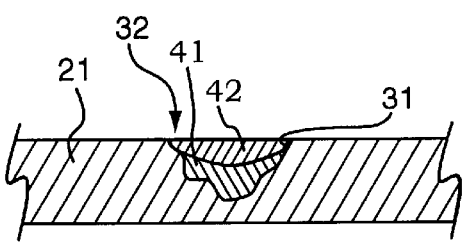

FIGS. 8 to 12 illustrate additional repair steps which my be desired given a deep void 32 where it may be desired to apply several thin layers of the repair composition 41 to ensure that each incremental amount of composition 41 is heat cured during each intermediate heating step. FIG. 8, in particular, shows an intermediate repair that is recessed after completion of steps 4 to 6 rather than flush as shown in FIG. 7. In this case, as shown in FIG. 9, an additional filling step is implemented wherein more repair composition 42 is inserted into the void 32 and on top of the repair composition that was previously inserted therein and heated (steps 4 to 6). FIG. 10 shows the state of the repair after inserting the section portion of repair composition 42 and FIG. 11 shows the application of heat thereto. FIG. 12 shows the final state of the repair.

The invention has been described with reference to a presently preferred embodiment and particular polyolefin object. It is not intended that the invention be unduly limited by this disclosure, but rather is intended that the invention be defined by the following claims.

We claim:

1. A method of repairing a surface blemish consisting of a void in a surface of a polyolefin object comprising the steps of:
    (a) inserting a repair composition into said void wherein said repair composition consists essentially of:
        (i) 30 to 60 weight percent of a thermoplastic component consisting of particulate polyolefin powder selected from the group consisting of polyethylene, polypropylene, and ethylene-vinyl acetate (EVA);
        (ii) 15 to 45 weight percent of a binder resin component selected from the group consisting of aliphatic and aromatic hydrocarbon, polyterpene, rosin and rosin-ester, chlorinated polyolefin resins, petroleum, and synthetic and oxidized waxes; and
        (iii) 5 to 35 weight percent of a solvent component; and
    (b) heating the repair composition in said void and a surrounding portion of said polyolefin object by exposing the repair composition and the surrounding portion of said polyolefin object to atmospheric heating at a temperature sufficient to fuse said repair composition to said polyolefin object.

2. The method of claim 1 wherein said step of inserting a repair composition into said void is accomplished by squeezing said repair composition from a tube containing a supply of said repair composition.

3. The method of claim 1 wherein said repair composition further includes a colorant.

4. The method of claim 3 wherein said colorant substantially matches a color of said polyolefin object.

5. The method of claim 3 wherein said colorant is a pigment.

6. The method of claim 3 wherein said colorant is a dye.

7. The method of claim 1 wherein said repair composition is sufficiently translucent to transmit a color of said polyolefin object.

8. The method of claim 7 wherein said binder resin is a cycloaliphatic hydrocarbon resin having a water white color.

9. The method of claim 1 wherein said polyolefin object is a polyethylene object.

10. The method of claim 1 wherein said heating step is accomplished by applying an open flame to the repair composition in the void.

11. The method of claim 1 wherein said heating step is accomplished by applying hot air from a heat gun to the repair composition in the void.

12. The method of claim 1 wherein the repair composition fills substantially all of said void after the heating step.

13. The method of claim 1 wherein a first portion of the repair composition fills a lower portion of said void after the heating step.

14. The method of claim 13 comprising the further steps of:
    (a) inserting a second portion of repair composition into said void, above said first portion of repair composition; and
    (b) heating the second portion of repair composition in said void and a surrounding portion of said polyolefin object by exposing the second portion of repair composition and the surrounding portion of said polyolefin object to atmospheric heating at a temperature sufficient to fuse said second portion of repair composition to said polyolefin object.

15. The method of claim 14 including the further steps of repeating the inserting and heating steps until the repair composition fills the void and is substantially flush with a surface of the polyolefin object.

16. A repair composition for repairing a surface blemish consisting of a void in a surface of a polyolefin object, said repair composition consisting essentially of:
    (a) 30 to 60 weight percent of a thermoplastic component consisting of particulate polyolefin powder selected from the group consisting of polyethylene, polypropylene, and ethylene-vinyl acetate (EVA);
    (b) 15 to 45 weight percent of a binder resin component selected from the group consisting of aliphatic and aromatic hydrocarbon, polyterpene, rosin and rosin-ester, chlorinated polyolefin resins, petroleum, and synthetic and oxidized waxes; and
    (c) 5 to 35 weight percent of a organic solvent component.

17. The repair composition claim 16 wherein said thermoplastic component is an high-density polyethylene.

18. The repair composition of claim 16 wherein said repair composition further includes a colorant.

19. The repair composition of claim 18 wherein said colorant substantially matches a color of said polyolefin object.

20. The repair composition of claim 19 wherein said colorant is a pigment.

21. The repair composition of claim 19 wherein said colorant is a dye.

22. The repair composition of claim 16 wherein said repair composition is sufficiently translucent to transmit a color of said polyolefin object.

23. The repair composition of claim 22 said binder resin is a cycloaliphatic hydrocarbon resin having a water white color.

24. The repair composition of claim 16 wherein the solvent component is selected from the group consisting of water, Toluene, Hexane, and 1-chloro-4 trifluoromethylbenzene.

* * * * *